United States Patent [19]

Peterson

[11] 3,709,142
[45] Jan. 9, 1973

[54] MULTI-PURPOSE COOKER

[75] Inventor: Ernest W. Peterson, Los Alamitos, Calif.

[73] Assignee: Ralston Purina Company, St. Louis, Mo.

[22] Filed: Sept. 18, 1970

[21] Appl. No.: 73,448

Related U.S. Application Data

[63] Continuation-in-part of Ser. No. 689,556, Dec. 11, 1967, Pat. No. 3,594,196.

[52] U.S. Cl. ................................. 99/357, 99/158
[51] Int. Cl. ............................................. A23b 3/06
[58] Field of Search..99/357, 346, 234, 18, 111–112, 99/158, 160, 188; 165/58, 59, 60–61, 62–63, 64–65, 66

[56] References Cited

UNITED STATES PATENTS

| | | | |
|---|---|---|---|
| 2,919,987 | 1/1960 | Erickson et al. | 99/111 |
| 2,919,988 | 1/1960 | Erickson et al. | 99/111 |
| 2,060,232 | 11/1936 | Manning et al. | 99/188 |
| 2,501,712 | 3/1950 | Chodziesner | 99/357 |
| 3,180,738 | 4/1965 | Lassen | 99/188 X |
| 3,353,476 | 11/1967 | Goodman et al. | 99/346 X |
| 3,482,509 | 12/1969 | Gardner | 99/357 |

Primary Examiner—Walter A. Scheel
Assistant Examiner—Arthur O. Henderson
Attorney—Robert W. Brukardt and Lawrence J. Hurst

[57] ABSTRACT

A method of preparing fish for canning and apparatus for use in the method which prevents dehydration and retards enzymatic and oxidative deterioration of the fish from the time of evisceration through precooking and cooling. The apparatus comprises a chamber having suitable means for refrigerated holding, precooking and cooling of fish. After the fish are eviscerated, they are placed in the chamber under refrigerated conditions to retard deterioration and to attain a substantially uniform temperature throughout the fish. The fish are then subjected to the precooking operation which due to the initial uniform temperature of the fish are precooked, they are cooled either by recirculating water saturated refrigerated air through the chamber or by initially utilizing evaporative cooling and thereafter recirculating water saturated refrigerated air through the chamber to cool the fish to a desired temperature.

7 Claims, 4 Drawing Figures

INVENTOR
ERNEST W. PETERSON
BY
Lawrence J. Hurst

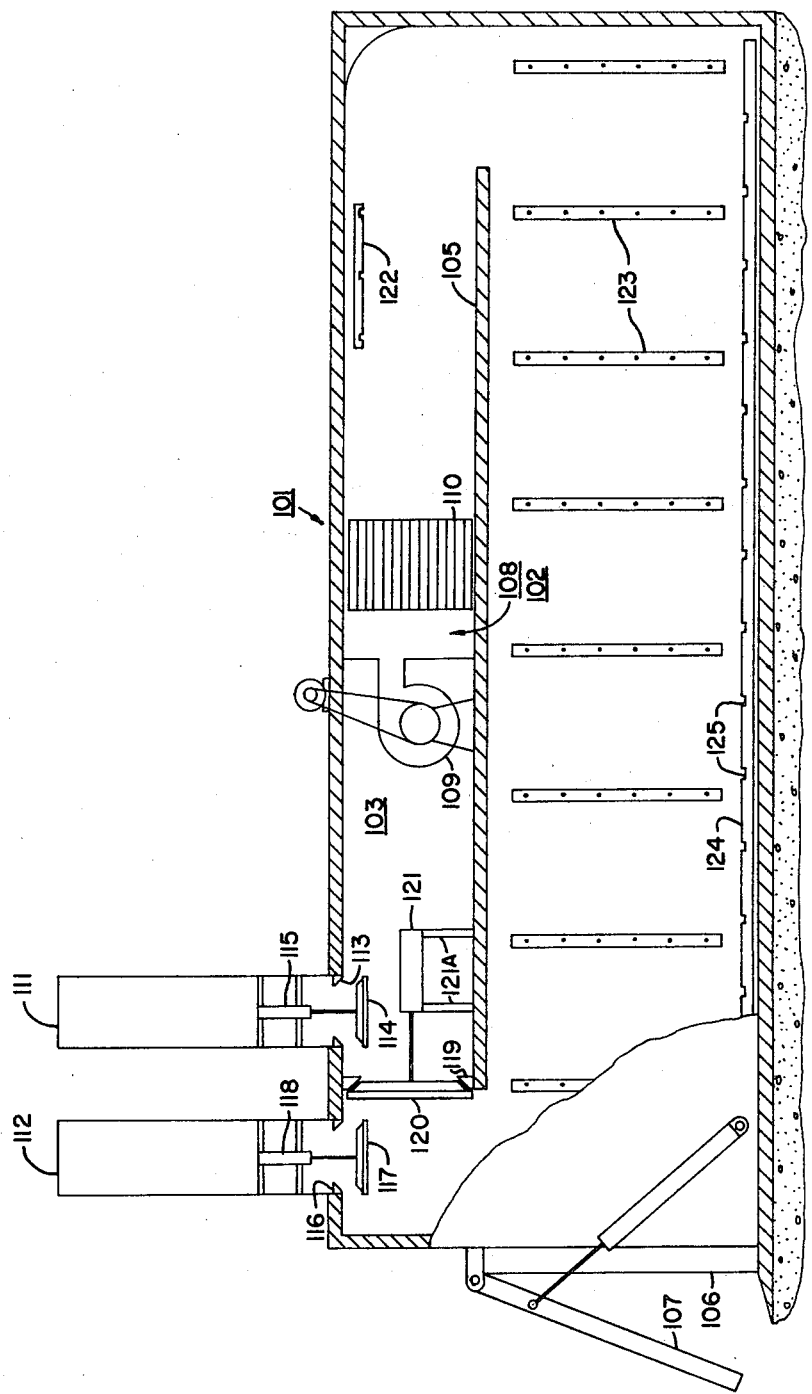

MULTI-PURPOSE COOKER

This application is a continuation-in-part of application, Ser. No. 689,556 filed Dec. 11, 1967 entitled "Multi-Purpose Cooker Method" now U.S. Pat. No. 3,594,196.

BACKGROUND OF THE INVENTION

This invention relates to an improved method of refrigerated holding, precooking, cooling and holding of fish prior to canning. This method is particularly useful for canning tuna and tuna-like fish, such fish include albacore, bluefin, bonito, skip-jack, yellowfin, and yellowtail; and in this specification the term "tuna" is intended to include all these fish. Heretofore, the method of preparing tuna for canning has comprised the steps of thawing the tuna under atmospheric conditions, eviscerating and placing the whole eviscerated tuna in wire baskets, placing several racks of these wire baskets into a steam autoclave or cooker, and after the precooking operation, the tuna is cooled by holding them in a room at ambient temperature and humidity. The above described method of processing the precooked tuna had many drawbacks. One of the more significant drawbacks or disadvantageous features was that the tuna prior to the precooking operation had not attained a uniform temperature and, therefore, was not uniformly cooked or prepared. In addition, the use of ambient air to cool the tuna resulted in dehydration of the tuna meat. Further, the treatment of fish was not uniform since changes in the ambient conditions correspondingly were reflected in the final product which resulted in variations of the surface dehydration and in variations of the oxidative and enzymatic deterioration in the flesh of the fish. Thus, the color and flavor quality of the fish was not uniform. Additionally, the bacteria present in the tuna following the ambient air cooling was very high. One of the causes of this high bacteria count present in the tuna was the contact by workers in moving the tuna while it its hot conditions.

Attempts to solve these problems have been made but heretofore none have done so satisfactorily. The prior art discloses the use of vacuum conditions for the cooling of whole tuna following the precooking operation. However, utilizing vacuum conditions for cooling did not solve the problem since the fish meat, being hotter in the center of the fish and having a higher pressure thereat, tends to explode or disintegrate. Furthermore, the moisture was carried off during such vacuum condition cooling which resulted in the tuna meat being dehydrated. Also, the equipment used for effecting these vacuum conditions had to be reenforced to withstand the pressures which made this equipment very expensive.

Other prior art attempts to solve this problem required the use of a substantially oxygen free zone into which an inert gas was introduced in quantities sufficient to maintain the pressure at a substantially atmospheric level during the cooling of the whole eviscerated tuna. The method of cooling had the disadvantageous or undesirable feature of requiring special containers and means for supplying the inert gas to the cooling chamber or zone. In addition, it was very expensive to utilize this type of system in the cooling of tuna.

Therefore, it is the prime object of this invention to provide a method of precooking and cooling whole tuna which is economic to operate and which does not require the use of an inert gas or rely on a vacuum condition.

Another object of this invention is to provide a method of holding, precooking and cooling whole eviscerated tuna which does not deleteriously affect the odor and flavor of the product.

Another object of the present invention is to provide a method which reduces oxidative deterioration and enzymatic changes of the tuna meat to produce a product having good color, odor and flavor qualities.

Another object of the present invention is to provide a method for the treatment of whole tuna which does not rely on ambient conditions and which tends to standardize the treatment given to various batches of fish.

Still another object of the present invention is to provide means for efficiently cooling the cooked tuna by initially utilizing evaporative cooling to cool the tuna to a predetermined temperature, and thereafter utilizing a closed air recirculation type of cooling.

Still another object of the present invention is to utilize water sprays in the cooling of the tuna to reduce the dehydration effect of the precooking operation.

These and other objects and advantages will become apparent hereinafter.

Briefly, one aspect of the present invention comprises a method of preparing whole tuna for canning wherein the tuna is kept in a chamber having suitable means for moisturizing the air and the tuna to prevent dehydration from the time of evisceration through the stages of refrigerated holding, precooking and cooling until removed for canning. Another aspect of the present invention is directed to the apparatus which comprises a chamber having means for supplying steam thereto for effecting the precooking of the fish and having other means for controlling the cooling of the fish.

In the drawings which illustrate an embodiment of the present invention,

FIG. 4 is a side view of another embodiment of the present invention.

Figure 1:
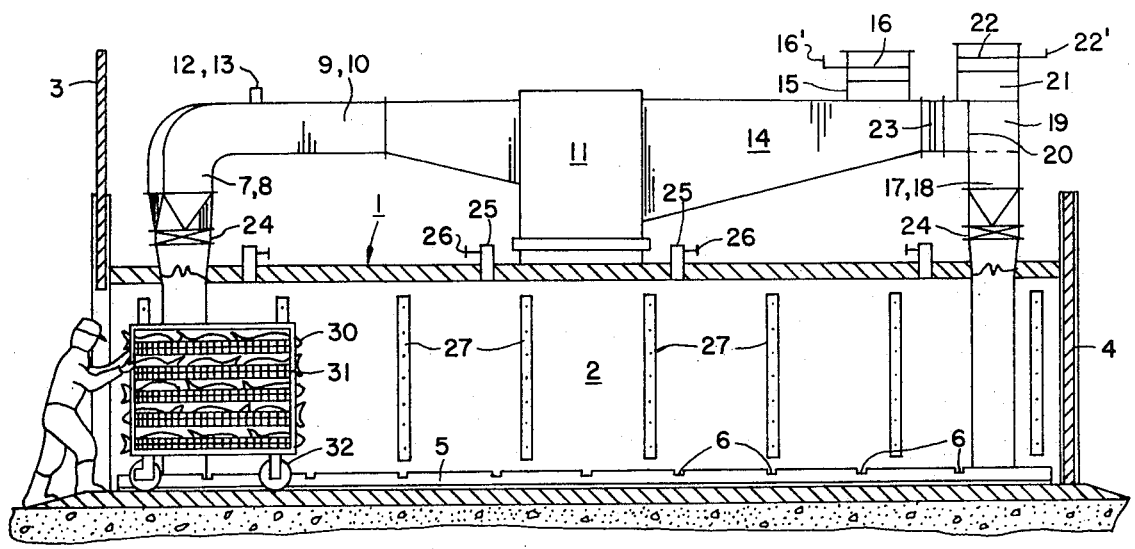
FIG. 1 is a somewhat diagrammatic view in side elevation of an autoclave suitable for refrigerated holding, precooking and later cooling fish in accordance with the principles of the present invention; the autoclave is shown while it is being loaded with fish in fish-holding racks.
Figure 2:
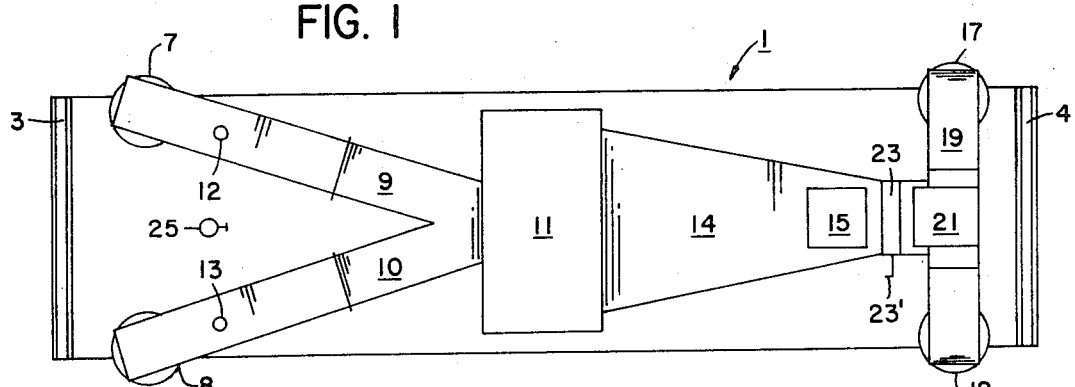
FIG. 2 is a top view of the autoclave of FIG. 1.

Referring now to FIGS. 1 and 2, the present invention may be practiced with an autoclave or housing indicated generally at 1 that serves as a combination refrigerated holding, precooking and cooling chamber 2. The chamber 2 may be in any shape, but is generally rectangular with a loading door 3 at the inlet end thereof and an unloading door 4 at the opposite or outlet end thereof. A pipe 5 having a plurality of openings 6 therein is provided in the chamber 2 adjacent the bottom or floor thereof to supply said chamber with heating or cooking steam from a suitable source of steam (not shown). Other suitable heating means may be utilized if desired. The chamber 2 is also provided with a pair of air inlet ducts 7 and 8 adjacent to the loading door 3. The inlet air ducts 7 and 8 are connected by suitable ducting 9 and 10 to a refrigeration coil or unit 11, including a fan, which is mounted on top of the autoclave 1. A pair of spray nozzles 12 and 13 are provided in the ducts 8 and 9, respectively, and said nozzles are connected to a suitable moisture source (not shown) to adjust the humidity of the air being supplied to the chamber 2 through the inlet ducts 7 and 8. Another duct 14 is provided on the opposite or inlet side of the refrigeration unit 11 and is intersected by an inlet air duct 15 communicating with the atmosphere. The inlet air duct 15 is provided with a valve or damper 16 and a handle 16' is connected to said valve for effecting the movement thereof between an open position permitting air flow through the duct 15 and a closed position preventing air flow therethrough.

Another pair of ducts 17 and 18 are provided on opposite sides of the chamber 2 adjacent to the unloading door 4 and are connected by a cross duct 19. The cross duct 19 connects with the duct 14, at a point indicated generally at 20, and at this point is provided an exhaust or effluent duct 21 which communicates with the atmosphere. The exhaust or outlet duct 21 is provided with a valve or damper 22 and a handle 22' is connected to said valve for effecting the movement thereof between an open position permitting air flow through the duct 21 and a closed position preventing air flow therethrough. It should be noted that another valve or damper 23 is provided in the passage or duct 14 intermediate the junctions of the ducts 15 and 21 therewith and a handle 23' is connected to said valve to effect the movement thereof between its open and closed positions. Also, it should be noted that butterfly valves 24 are provided in each of the inlet and outlet ducts 7, 8 and 17, 18 respectively such that when the valves 24 are closed, the chamber 2 is isolated from the ducts communicating with the atmosphere and the refrigeration unit 11. A plurality of exhaust valves 25 are provided in the autoclave 1 at the top of the chamber 2 to permit the exhaustion of air from said chamber when steam is supplied thereto. The exhaust valves 25 are provided with handles 26 for effecting the movement of said valves between their open and closed positions. In addition, a plurality of spray nozzles indicated generally at 27 are provided in the walls of the chamber 2 for discharging moisture into said chamber and onto the fish as will be discussed more fully herein.

Figure 3:
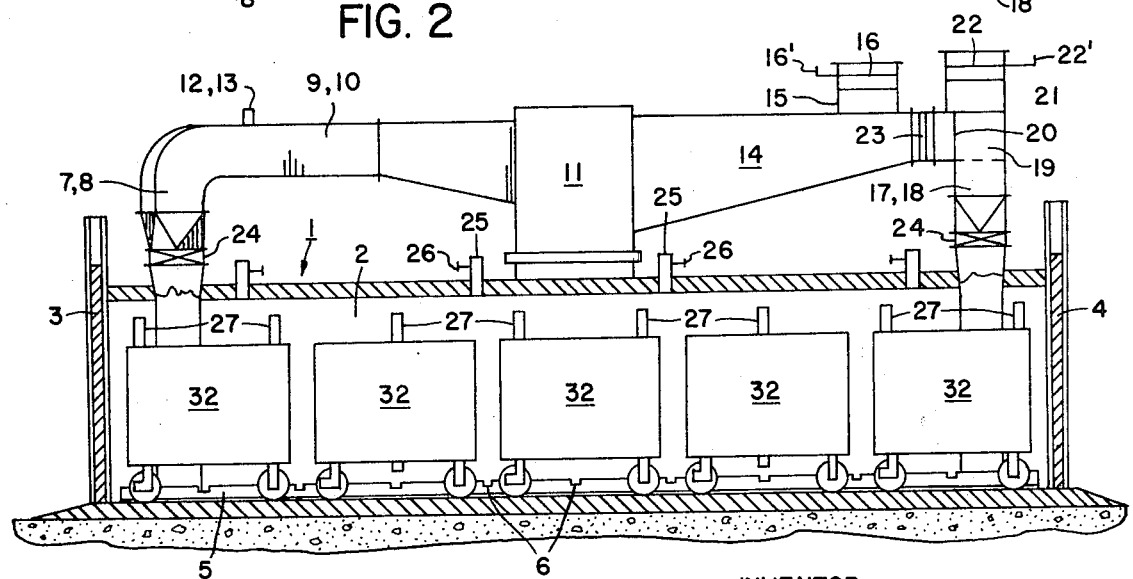
FIG. 3 is a view of the autoclave of FIG. 1 with the doors thereof closed.

In the processing of fish, as shown in FIG. 1, the whole eviscerated fish 30 having the skin on are placed in wire baskets 31 that are loaded upon wheeled racks 32 as is well known in the art. The loaded racks 32 are moved into the chamber 2 through the loading door 3, the unloading door 4 being closed. When the chamber 2 has been filled with the racks 32, the loading door 3 is closed, so that both doors are shut (see FIG. 3). The doors 3 and 4 are provided with fluid pressure seals so that when the doors are shut, the interior of the chamber 2 is then substantially isolated from the atmosphere, except for the air inlet 16 and effluent outlet 21.

Initially, the fish are subjected to a refrigerated holding operation. This refrigerated holding operation is effected by opening the butterfly valves 24 and the valve 23 and closing the valves 16 and 22 such that a closed air of recirculation system is established. With the closed air or recirculation system, the air in the chamber 2 is circulated through the ducts 17, 18, 19 and 14 through the refrigeration unit 11 and therefrom through the ducts 9, 10 and 7, 8 back into the chamber 2. The refrigerated air normally has a temperature between 30° – 35° F. and as it passes through the ducts 9 and 10, moisture is added from the nozzles 12 and 13 in response to a demand from a humidistat (not shown) to maintain the relative humidity of the refrigerated air at approximately 100 percent. In addition, it may be desirable to continually spray water on the fish 30 from the nozzles 27. This serves to maintain the surface of the fish 30 moist so that the dehydration effect of storage is reduced. Further, the refrigerated holding serves to reduce the deterioration of quality and yield which normally accompanies the holding of fish.

This refrigerated holding period will extend for such a period of time that the fish are allowed to cool to a uniform desired temperature in the range of 30° – 35° F., but the fish is no maintained in a frozen or solid state. The average holding time will be approximately 8 hours prior to precooking; however, this holding time may vary from 2 hours up to several days depending upon the production schedules of the fish operating plants. Thus, this refrigerated holding allows for a more flexible schedule for the processing of fish and retards the deterioration of the quality of the fish normally encountered in the holding of fish. In addition, the initial holding of the fish to obtain a substantially uniform temperature throughout the fish, establishes more uniform treatment of the fish so that the quality of the finished product will be more consistently maintained. This is contrary to the present practice wherein fish in various conditions of being frozen, or thawed, and at different temperatures are subjected to the precooking operation so that a uniform treatment is not obtained.

After the fish have been held for a predetermined time such that they are no longer in the frozen state and are substantially uniformly cooled throughout, the fish are subjected to the precooking operation. To effect the precooking operation, the butterfly valves 24 are closed to isolate the chamber 2 from the atmosphere and from the refrigeration unit 11. In addition, the water spray from the nozzles 27 is turned off if it is being used and the exhaust valves 25 are then opened to connect the chamber 2 with the atmosphere. Steam is then supplied through the pipe 5 and openings 6 therein to the chamber 2. The supplying of steam to the chamber 2 while the exhaust valves 25 are open permits the cool air to be vented from the chamber. After the cool ambient air is vented from the chamber 2, which will normally require approximately 10 to 15 minutes, the exhaust valves 25 are closed to again isolate the chamber 2 from the atmosphere and the refrigeration unit 11. This venting operation to effect the removal of the cool air prior to the precooking of the fish serves to reduce the oxidation of the surface fats of the fish during precooking.

Steam is then supplied through the nozzles 5 to raise the temperature in the chamber 2 and to precook the raw fish. The cooking operation lasts for a sufficient period of time to raise the temperature of the fish meat at the backbone to at least 135° F. Of course, it is obvious that the cooking time will vary depending on the species of fish being processed and the essential parameter for this operation is the minimum temperature of 135° F. at the backbone of the fish. In a normal precooking operation, there is an appreciable amount of dehydration losses which is somewhat overcome by applicant's using saturated steam which reduces dehydration losses. In addition, the holding of the fish in a water saturated air atmosphere preparatory to precooking aids in minimizing the dehydration effect of the steam cooking. Further, since the fish were initially cooled substantially uniformly throughout, the cooking has substantially the same effect on all of the fish in the chamber 2 so that substantially uniform quality of the fish may be maintained.

Upon the completion of the precooking operation, the steam supplied to the chamber 2 is interrupted or shut off and the fish are subjected to a cooling operation. This is accomplished by initially subjecting the fish to evaporative cooling by opening the butterfly valves 24, valve 16 and valve 22 and closing the valve 23, so that an open air system is established. The fan portion of the cooling unit 11 is turned on, which serves to pull ambient air through the ducts 15 and 14. The fan then forces the air through the ducts 9, 10, 7 and 8 into the chamber 2 and passes therefrom through the ducts 17, 18, 19 and 21 where it is exhausted to atmosphere. As the ambient air is passed through the chamber 2 to effect cooling of the fish therein, a spray of water is ejected from the nozzles 27 to contact the surfaces of the whole fish which not only reduces the dehydration thereof, but also assists in the cooling due to the evaporative cooling effected by the air passing over the moist surface of the fish. The evaporative cooling operation effects the rapid cooling of the fish from the elevated temperature of at least 135° F. at the backbone thereof. This rapid cooling of the fish by the evaporative cooling operation reduces the oxidative affect of the precooking operation and also retards the dehydration of the fish meat. The length of time this evaporative cooling operation lasts will be dependent upon the size and species of the fish being processed and also on the temperature of the ambient air. A typical evaporative cooling operation would last for approximately 1½ hours and reduces the temperature of the fish at the backbone from approximately 135° F. to an intermediate temperature, such as approximately 100° F.

After the evaporative cooling operation, the fish are subjected to a refrigerative cooling operation to reduce the temperature of the fish to a desired temperature at the backbone of approximately 60° – 85° F. The refrigerative cooling operation is effected by closing the valves 16 and 22 and opening the valve 23 such that the closed recirculation system as utilized in the refrigerated holding operation (as hereinabove described) is established. The refrigeration unit 11 serves to dissipate the heat as the air recirculates through the system and this air is maintained at approximately 100 percent relative humidity by the moisture injected into the air stream through the nozzles 12 and 13 in response to the humidistat (not shown). In addition, depending on the species of the fish being processed, it may be desirable to intermittently activate the nozzles 27 to supply moisture to the surface of the fish as they are subjected to this refrigerated cooling operation. The length of the refrigerative cooling operation will be dependent upon the size and species of the fish being processed and the temperature of the fish when the transfer is made from the evaporative cooling operation to the refrigerative cooling operation. It should also be understood that although the refrigerative cooling operation will be utilized to reduce the temperature of the fish to approximately 60° – 85° F., which it has been found to be the most desirable temperature for handling and for further processing, it is possible with this system to reduce the temperature of the fish to any desired level. Thus, it may be possible to reduce the temperature of the fish to a value suitable for refrigerative storage for later use depending on production schedules, etc. Since the normal holding temperature of fish is approximately 35° F., it may be desirable to cool the fish to this temperature and store them for subsequent use.

It should be realized that since the fish are not totally cooled in ambient conditions, that a more uniform cooling is effected such that the end product can be more closely controlled and uniformly produced. In addition, the fish may be held for extended periods of time after the precooking operation without deleteriously effecting the fish. The refrigerated conditions reduce quality deterioration and yield losses normally experienced in the ambient air type of holding operation.

Further, it should be understood that the cooling operation does not necessarily have to be performed in the two stage operation (evaporative cooling followed by refrigerated cooling), but may be accomplished merely by using the refrigerative cooling operation. In this instance, the precooked fish will be subjected to the closed system of recirculating water saturated refrigerated air. In utilizing this method, it would not be necessary to expose the fish to ambient air conditions for evaporative cooling but would merely require the refrigeration cooling to reduce the temperature of the fish from 135° F. at the backbone to the desired temperature. However, it is preferably that the two stage cooling operation be utilized. Additionally, it should be noted that since the whole fish are not touched or moved by the operator between the precooking and cooling step, the bacteria present in the tuna at the end of the cooling operation is substantially reduced from the prior art methods. A test performed on tuna which had been precooked in accordance with the present application and then cooled and held at 55° F. for 40 hours exhibited an average bacterial count of only 455 colonies per square cm. of skin. This is a substantial reduction in bacteria in the tuna when compared with an average bacteria count of over 2,000,000 colonies per square cm. of skin for tuna which were unloaded by an operator and cooled in ambient air.

Referring now to FIG. 4, another embodiment of the apparatus capable of carrying out the above described method is shown. Specifically, an autoclave or housing 101 is provided with a chamber 102 which is separated from an upper air passage 103 by the horizontally extending brace member 105 which is secured to the housing 101. An opening 106 is provided in the housing 101 to permit the ingress and egress of the racks of fish 32 to the chamber 102. A door 107 is provided on the housing 101 and is provided with suitable means, such as gaskets, so that when the door 107 is in its closed position, a pressure fluid seal is formed with the housing 101 preventing air flow into the chamber 102. The brace member or support 105 is provided so that it is spaced a predetermined distance from each of the ends of the housing 101 so as to define a passage for air flow between the chamber 102 and the passage 103. A refrigeration unit indicated generally at 108 is provided on the support 105 and the refrigeration unit includes a fan member 109 and refrigeration coils 110.

An air inlet 111 is provided in the housing 101 and connects with the passage 103 and the chamber 102. In addition, an effluent outlet 112 is provided in the leftward end of the housing 101 and connects with the passage 103 and the passage 102. An annular seal or valve seat 113 is provided in the air inlet 111 adjacent to the juncture of the air inlet and the flow passage 103. A valve member 114 is connected to a fluid pressure operated motor or piston 115 which serves to move the valve 114 to control the flow of air between the air inlet 111 and the chamber 102. The fluid pressure operated motor or piston 115 is mounted in the air inlet 111 by suitable means as is well known in the art and is driven by controls which may be placed anywhere which is convenient for operation (not shown). Thus, the valve 114 may be moved from a position disengaged from the valve seat 113 to permit air flow from the air inlet 111 to the passage 103 or valve member 114 may be moved to a position engaging the valve seat 113 so as to prevent fluid pressure flow or air passage from the air inlet 111 to the chamber 102. The effluent outlet 112 is provided with a valve seat 116, valve member 117 and fluid pressure operated motor or piston 118 which operates in the same manner as the valve 114 and valve seat 113 of the air inlet 111. Thus, when the valve 117 is disengaged from the valve seat 116 fluid pressure flow is permitted between the chamber 102 and the effluent outlet 112 and when the valve member 117 is engaged with the valve seat 116, fluid pressure flow is prevented between the chamber 102 and the effluent outlet 112.

In addition, it should be noted that an annular valve seat 119 is provided about the passage 103 intermediate of the air inlet 111 and the effluent outlet 112. A valve member 120 is provided in the air passage 103 for engagement with the valve seat 119. Valve member 120 is moved or driven by fluid pressure operated cylinder 121 provided in the passage 103. The fluid pressure operated cylinder 121 is controlled by means external from the passage 103 (not shown) and may be located in the passage by any suitable means such as braces or brackets 121A. It should be noted that when the valve member 120 is in engagement with the valve seat 119 recirculating fluid pressure flow between the chamber 102 and the air passage 103 is prevented and when the valve member 120 is disengaged from the valve seat 119 a continuously recirculating air pattern between the chamber 102 and air passage 103 is established.

To complete the description of the autoclave 101, it should be noted that the water sprays 122 are provided in the housing 101 adjacent the rightward end thereof for spraying water into the air as it is circulated through the air passage 103. In addition, water spray nozzles 123 are provided in the chamber 102 for supplying water to the surface of the fish as has been previously described. Further, a pipe 124 having a plurality of openings 125 therein is provided in the chamber 2 adjacent the bottom or floor thereof to supply the chamber with cooking steam from a suitable source (not shown).

In operation, the autoclave 101 operates substantially the same as does the autoclave 1 as previously described. Specifically, after fish have been wheeled into the chamber 102, the valves 114 and 117 are closed preventing air flowing through the air inlet 111 and effluent outlet 112 while the valve 120 is maintained open to establish the continuously recirculating air pattern between the chamber 102 and passage 103. In addition, the door 107 is closed which serves to substantially isolate the chamber 102 from the atmosphere. The refrigeration unit 108 is then activated which serves to move refrigerated air through the air passage 103 and the chamber 102 to establish a recirculating refrigerated air flow. If desired, the water sprays 122 and 123 are activated so as to have the humidity controlled at approximately 100 percent by a humidistat not shown. When the cooking step is to be performed, the valve 120 is also moved into engagement with the valve seat 119 and the precooking operation is performed as was described with respect to the autoclave 1. Following the cooking operation, the initial ambient air or evaporative cooking step is performed by opening the valves 114 and 117 and activating the fan 109. Since the valve 120 is closed when the valves 114 and 117 are opened, the air flow established would be from the air inlet 111 through the passage 103, and chamber 102 to the effluent outlet 112. The refrigerated cooling would then be accomplished in the same manner as the refrigerated holding, i.e., close valves 114 and 117 and open valve 120.

From the foregoing, it is now apparent that a novel multi-purpose cooker and method of processing tuna meeting the objects set out hereinbefore is provided and that changes or modifications as to the precise configurations, shapes and details of the construction and method set forth in the disclosure by way of illustration may be made by those skilled in the art without departing from the spirit of the invention as defined by the claims which follow.

I claim:

1. Apparatus for treating racks of tuna-like fish comprising a housing having a chamber therein, a door in said housing permitting the ingress and egress of the racks containing the fish, refrigeration means on said housing and connected to said chamber for supplying refrigerated air thereto, an air inlet connected to said chamber, an effluent outlet connected to said chamber, passage means connecting said air inlet, outlet and refrigeration means, and flow control means in said passage means, said flow control means being movable between a position permitting pressure fluid flow from said air inlet to said outlet through said chamber and a position permitting recirculating pressure fluid flow between said refrigeration means and said chamber, and heating means in said chamber.

2. The apparatus according to claim 1 wherein said flow control means includes a first valve means in said passage means controlling the flow of ambient air from said air inlet to said chamber, a second valve means in said passage means controlling the flow of effluent from said chamber to said effluent outlet and the third valve means in said passage means between said air inlet and said effluent outlet, said third valve means being movable between a first position permitting recirculating pressure fluid flow between said refrigeration means and said chamber when said first and second valve means are positioned to prevent pressure fluid flow through said air inlet and said effluent outlet and a second position permitting ambient air flow through said chamber when said first and second valve means are positioned to permit pressure fluid flow through said air inlet and effluent outlet.

3. Apparatus for treating racks of tuna-like fish comprising a housing having a chamber therein, a door in said housing permitting the ingress and egress of the racks containing the fish, refrigeration means on said housing and connected to said chamber for supplying refrigerated air thereto, an air inlet connected to said chamber, valve means in said air inlet controlling the flow of ambient air to said chamber, an outlet connected to said chamber, other valve means in said air outlet controlling the flow of effluent from said chamber, passage means connecting said air inlet and outlet, and flow control means in said passage means, said flow control means being movable between a closed position permitting pressure fluid flow from said air inlet to said outlet through said chamber and an open position permitting recirculating pressure fluid flow between said refrigeration means and said chamber when said first named and other valve means are preventing pressure fluid flow through said air inlet and outlet, and heating means in said chamber.

4. The apparatus according to claim 3 including water spray nozzles in said chamber and positioned to spray water on the racks of fish within the chamber.

5. The apparatus according to claim 3 including heating valve means between said refrigeration means and said chamber for substantially isolating said chamber when heat is supplied thereto.

6. Apparatus for treating racks of tuna-like fish comprising a housing having a chamber therein, a door in said housing permitting the ingress and egress of the racks containing the fish and forming a pressure fluid seal with said housing when in the closed position, refrigeration means on said housing and including a passage connecting with said chamber, an air inlet connected with said passage, valve means in said air inlet controlling the air flow therethrough, an effluent outlet connected to said chamber, other valve means in said effluent outlet controlling the flow therethrough, and flow control means in said passage movable between an open and closed position, said flow control means when in the open position permitting recirculating pressure fluid flow between said refrigeration means and said chamber and when in the closed position permitting pressure fluid flow between said air inlet and effluent outlet through said chamber, and heating means in said chamber.

7. The apparatus according to claim 6 including water spray nozzles in said chamber and positioned to spray water on the racks of fish within the chamber.

* * * * *